F. F. BURTON.
TELESCOPE SIGHT MOUNT FOR FIREARMS.
APPLICATION FILED FEB. 26, 1910.
960,813.  Patented June 7, 1910.
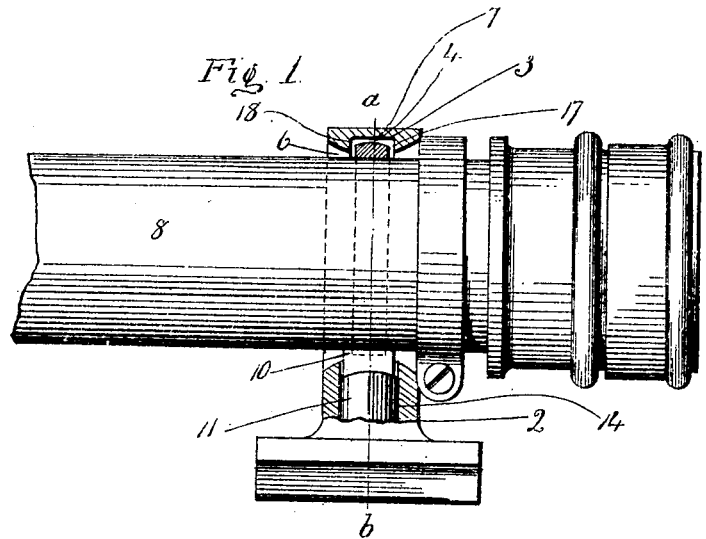
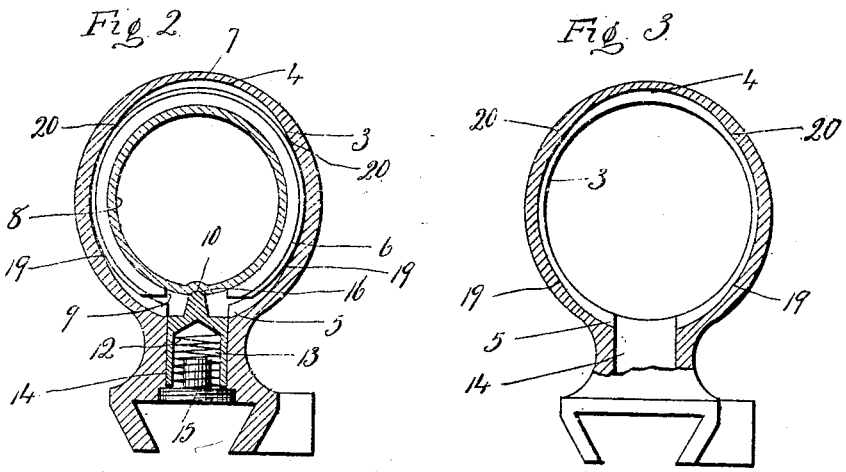
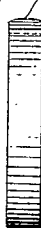 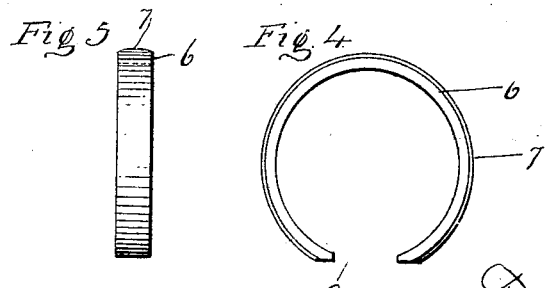
Witnesses
C. J. Reed.
C. L. Weed.
Inventor
Frank F. Burton
by Seymour & Earle
Atty

UNITED STATES PATENT OFFICE.

FRANK F. BURTON, OF NEW HAVEN, CONNECTICUT, ASSIGNOR TO WINCHESTER REPEATING ARMS CO., OF NEW HAVEN, CONNECTICUT, A CORPORATION.

TELESCOPE-SIGHT MOUNT FOR FIREARMS.

960,813.  Specification of Letters Patent.  Patented June 7, 1910.

Application filed February 26, 1910. Serial No. 546,054.

*To all whom it may concern:*

Be it known that I, FRANK F. BURTON, a citizen of the United States, residing at New Haven, in the county of New Haven and State of Connecticut, have invented a new and useful Improvement in Telescope-Sight Mounts for Firearms; and I do hereby declare the following, when taken in connection with the accompanying drawings and the letters of reference marked thereon, to be a full, clear, and exact description of the same, and which said drawings constitute part of this specification, and represent, in—

Figure 1 a broken view showing the front end of a telescope in side elevation, and the front telescope-mount in vertical section. Fig. 2 a view in vertical transverse section on the line *a—b* of Fig. 1. Fig. 3 a detached broken view in vertical section of the mount. Fig. 4 a detached view in elevation of the cushioning-ring. Fig. 5 an edge view thereof.

My invention relates to an improved front mount for telescope sights for firearms, the object being to provide simple, durable and reliable means for reducing the shock to a telescope sight to the minimum, whereby the telescope-tube is prevented from being indented or the telescope otherwise damaged by the shock of firing.

With these ends in view my invention consists in the combination with the front mount of a telescope sight, of a cushioning-ring located within the said mount and receiving the telescope tube.

My invention further consists in the construction and combination of parts to be hereinafter described and pointed out in the claims.

In carrying out my invention, as herein shown, the front telescope mount 2 is formed upon its inner face with an annular groove 3 the upper portion of which is deepened as at 4 and the lower portion of which is deepened as at 5. This groove receives a cushion in the form of a split ring 6 having its exterior periphery slightly convexed as at 7 so as to form a single bearing point on which the forward end of the telescope-tube 8 may be rocked, as it were, as its rear end, which is not shown, is moved vertically or laterally. The lower end of the said cushioning-ring 6 is split to form an opening 9 for the reception of the nose 10 of a plunger 11 forced upward by a spring 12 located in a chamber 13 in the stem 14 of the mount 2 and confined in the said chamber by a screw-plug 15, the nose 10 of the plunger entering a longitudinal groove 16 formed by indenting the lower face of the telescope-tube 8 which is thus held against rotation, though left free to be reciprocated. The ring is also held against rotating by the nose 10 of the plunger.

The ring 6 is made a trifle smaller in internal diameter than the external diameter of the tube 8 which it clasps with a spring fit, but not so tight as to prevent the said tube from moving back and forth through the ring which is confined in place by the square shoulders 17 and 18 formed by the front and rear walls of the annular groove 3. At the time of the recoil following the firing of the gun, the barrel "whips" up and down. This "whipping" of the barrel up or down is of course transmitted to the telescope, which, being delicate in structure and organization is not well adapted to withstand this "whipping" and jarring. When the barrel "whips" up, the mount 2 being fastened rigidly to the gun-barrel, will rise with relation to the telescope, and the bottom walls of the groove 3 will engage with the ring 6 at about the points 19, 19, where the deepened lower portion 5 of the said groove merges into the sides thereof. Then the ends of the ring will apparently yield downward into the deepened lower portion 5 of the groove just enough to relieve the telescope 8 from shock. Conversely, if the barrel of the gun " whips" down at the time of recoil, the mount 2 will be moved downward with respect to the telescope and the top wall of the groove 3 will engage the ring 6 at about the points 20 where the deepened upper portion 4 of the groove merges into the sides thereof. The middle portion of the upper half of the ring 6 will then apparently give slightly into the deepened upper portion of the groove and so relieve the telescope from shock. But whatever be the behavior of these parts at the moment of firing, the effect is to relieve the delicate telescope tube 8 from shock and prevent the indentation thereof, or the damaging of the telescope.

I claim:—

1. The combination with a front telescope mount having an internal groove, the upper and lower portions of which are deepened, of a split ring located in the said groove and receiving the front end of the telescope-tube which is cushioned by the said ring.

2. The combination with a front telescope-mount formed with an internal annular groove the upper and lower portions of which are deepened, of a split ring located in the said groove and receiving the front end of the telescope-tube which is cushioned by the said ring, and a spring-actuated plunger located in the said mount and provided with a nose passing between the ends of the said split ring and entering a longitudinal groove in the said tube, whereby the said ring and tube are held against rotation with respect to the mount.

In testimony whereof, I have signed this specification in the presence of two subscribing witnesses.

FRANK F. BURTON.

Witnesses:
THOMAS C. JOHNSON,
DANIEL H. VEADER.